United States Patent Office 2,784,313
Patented Mar. 5, 1957

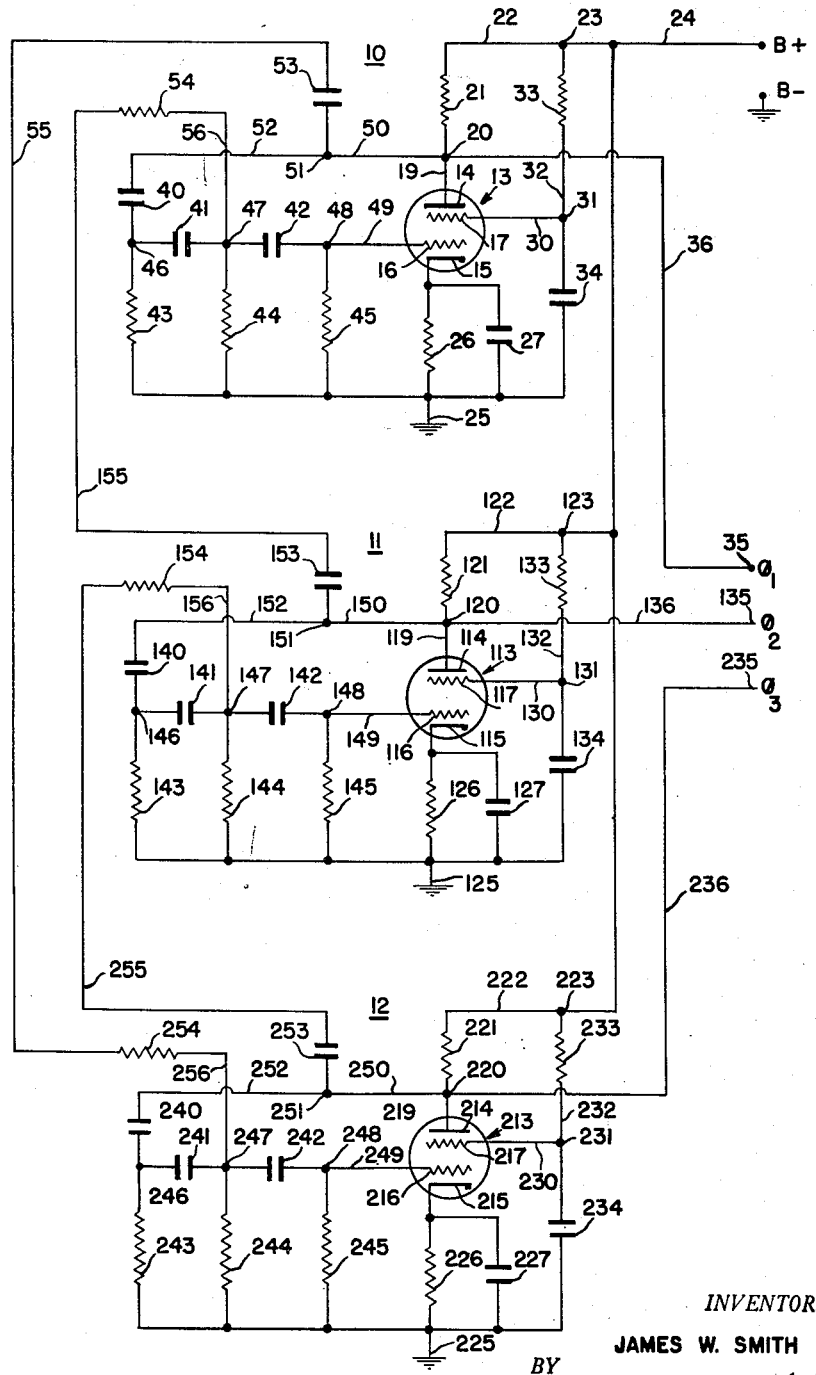

2,784,313

OSCILLATOR POWER SUPPLIES

James W. Smith, Minneapolis, Minn., assignor to Minneapolis-Honeywell Regulator Company, Minneapolis, Minn., a corporation of Delaware Application October 28, 1953, Serial No. 388,885

3 Claims. (Cl. 250—36)

This invention relates broadly to an oscillator power source for generating polyphase energy for use in electrical systems.

An object of the invention is to provide an alternating current generator for polyphase energy utilizing electron tube oscillators.

Another object of the invention is to provide a three-phase power source in which phase-shift oscillators are interconnected to maintain their output currents at a phase displacement of 120° from each other.

In brief, the invention as illustrated includes three identical phase-shift oscillators which are so inter-connected as to produce a three-phase output current which may be used to power a suitable load device.

Referring to the single figure of the drawing, the power supply comprises three separate oscillators 10, 11 and 12 which are of the conventional phase-shift configuration. Oscillator 10 includes an amplifying device 13 shown as a tetrode which has an anode 14, a cathode 15, a control grid 16, and screen grid 17. The amplifying device might also be a triode, pentode or other type of amplifier. The anode 14 is connected to a positive potential source, not shown, through a conductor 19, a junction 20, a resistance 21, a conductor 22, a junction 23 and a conductor 24. The cathode 15 is connected to ground 25 by means of a resistance 26 and a bypass capacitor 27. The screen grid is connected to the positive potential source by a conductor 30, a junction 31, a conductor 32, a resistor 33, junction 23, and conductor 24. A capacitor 34 is connected between ground 25 and junction 31 to effectively ground the screen grid to A. C. signals. An output terminal 35 of oscillator 10 is connected to the anode 14 by conductor 19, junction 20 and a conductor 36. A three-mesh resistance-capacity phase shifting network is connected from anode 14 to control grid 16 and comprises capacitors 40, 41 and 42 and resistors 43, 44 and 45. Specifically the feedback path from anode 14 is through conductor 19, junction 20, a conductor 50, a junction 51, a conductor 52, capacitor 40, a junction 46, capacitor 41, a junction 47, capacitor 42, a junction 48, and a conductor 49 to control grid 16. Resistors 43, 44 and 45 are connected from junctions 46, 47 and 48, respectively, to ground 25 thus completing the phase shift network.

Oscillators 11 and 12 are identical to oscillator 10. The corresponding elements in oscillator 11 are designated by numerals 100 higher in each instance, and similarly those in oscillator 12 by numbers 200 higher than used to designate the corresponding elements in oscillator 10. It is believed that with this understanding, the arrangement of the elements in oscillators 11 and 12 will be obvious and need not be described in detail.

The output of oscillator 10 is connected to a point 247 in the input of oscillator 12 through a capacitor 53 and a resistor 254. The circuit is from anode 14, conductors 19 and 50, junction 51 to capacitor 53, conductor 55, resistor 254, and conductor 256 to junction 247. Since each of the capacitor-resistor combinations in the feedback network from anode to control electrode produces a 60 degree phase shift at the operating frequency, it may be seen that the output of oscillator 10 is connected to a point on oscillator 12 to make it oscillate with 120 degrees phase difference from the output of oscillator 10. Similarly the output of oscillator 12 is connected to a point 147 in the input of oscillator 11 through a capacitor 253 and a resistor 154, thus maintaining oscillator 11 at a phase difference of 120 degress from oscillator 12. In a like manner the output voltage from the anode 114 of oscillator 11 is connected to the input of oscillator 10 through a capacitor 153 and a resistor 54. Three phase power is available therefore from output terminals 35, 135 and 235 which are connected to the anodes of oscillators 10, 11 and 12 respectively and these terminals may be connected to a suitable load device to supply three phase power thereto.

It should now be clear that each of the three oscillators has a connection from its output circuit to the input circuit of one of the other oscillators to maintain a constant phase difference between the output currents.

In one embodiment of the circuit the following values were used:

| Number | | Value |
|---|---|---|
| 21 | ohms | 33,000 |
| 26 | do | 1,800 |
| 33 | do | 40,000 |
| 43, 44, 45 | megohm | .47 |
| 54 | do | 1. |
| 27 | mfd | 10 |
| 34 | mfd | .1 |
| 40, 41, 42 | mfd | .0005 |
| 53 | mfd | .00025 |

This power supply is very stable in operation since each of the oscillators is independently capable of oscillation and the interconnections act to maintain a constant phase difference between the oscillators. The output current may be utilized to operate a three-phase motor or other suitable load device.

The invention is not limited to a three-phase power supply, since by choosing the proper phase shifting feedback network for the oscillator to obtain the proper phase difference between oscillators a polyphase power supply may be easily designed with the desired number of phases.

In general, while I have shown a certain specific embodiment of my invention, it is to be understood that this is for the purpose of illustration and that my invention is to be limited solely by the scope of the appended claims.

I claim as my invention:

1. A three-phase power supply system comprising in combination; first, second and third independent phase shift oscillators, each of said oscillators having separate phase shifting feedback circuits, said separate phase shifting circuits each comprising a plurality of phase shifting networks connected in tandem; an alternating output potential generated by each oscillator; and circuit means interconnecting the output of each of said oscillators to a point in the phase shifting feedback circuit of another of said oscillators to maintain equal phase displacement between said potentials.

2. An electrical power supply comprising in combination; a plurality of phase shift oscillators, each of said oscillators including an electron discharge device having an anode, a cathode, and a control member, an output circuit connected to each of said anodes, an output potential supplied from each oscillator, each of said oscillators also including a separate independent feedback circuit connected between said control member and said anode, each of said feedback circuits comprising three phase shifting networks connected in tandem to provide a 180 degree phase shift of the output waveform from said anode to said control member, and circuit means interconnecting the anode of each of said oscillators to a junction between said feedback phase shifting networks of another of said oscillators, said junction being a point, a predetermined number of degrees removed electrically from its respective anode, to maintain equal phase displacement between said potentials.

3. A three-phase power supply comprising in combination; first, second, and third phase shift oscillators, each of said oscillators including an electron discharge device having an anode, a cathode, and a control member, an output circuit connected to each of said anodes, an alternating output potential supplied from each oscillator, each of said oscillators having its own independent feedback circuit connected between said control member and said anode, said independent feedback circuit each comprising a first, second and third phase shifting network connected in tandem, each of said networks providing a 60 degree phase shift of the output waveform, and circuit means interconnecting the anode of each of said oscillators to a junction between the second and third phase shift networks of another of said oscillators, said junction being at a point 120 degrees electrically removed from its respective anode, to maintain equal phase displacement between said potentials.

References Cited in the file of this patent

FOREIGN PATENTS 906,483  France _____ May 22, 1945

OTHER REFERENCES

Article, "Phase Shift Oscillators" by Ginzton et al., pages 43–48 of Pro. of IRE, vol. 29; No. 2; Feb. 1941.

Article, "N-Phase "Resistance-Capacitance Oscillators" by Barrett, pages 541–545 of Proc. of IRE, vol. 33, No. 8; Aug. 1945.